US012811626B2

(12) United States Patent
Yu et al.

(10) Patent No.: US 12,811,626 B2
(45) Date of Patent: Nov. 24, 2026

(54) POWER LINE CARRIER COMMUNICATION APPARATUS, METHOD, AND SYSTEM

(71) Applicant: HOYMILES POWER ELECTRONICS INC., Hangzhou (CN)

(72) Inventors: Hongbin Yu, Hangzhou (CN); Yanliang Cai, Hangzhou (CN); Shigao Zhou, Hangzhou (CN); Yi Zhao, Hangzhou (CN); Bo Yang, Hangzhou (CN)

(73) Assignee: HOYMILES POWER ELECTRONICS INC., Hangzhou (CN)

( * ) Notice: Subject to any disclaimer, the term of this patent is extended or adjusted under 35 U.S.C. 154(b) by 139 days.

(21) Appl. No.: 18/641,518

(22) Filed: Apr. 22, 2024

(65) Prior Publication Data

US 2024/0275430 A1 Aug. 15, 2024

Related U.S. Application Data

(63) Continuation of application No. PCT/CN2022/114506, filed on Aug. 24, 2022.

(30) Foreign Application Priority Data

Apr. 27, 2022 (CN) ......................... 202210451949.8

(51) Int. Cl.
*H04B 3/54* (2006.01)
*H04B 3/21* (2006.01)

(52) U.S. Cl.
CPC ............... *H04B 3/542* (2013.01); *H04B 3/21* (2013.01); *H04B 3/548* (2013.01); *H04B 2203/5491* (2013.01)

(58) Field of Classification Search
CPC .......... H04B 3/21; H04B 3/548; H04B 3/542; H04B 3/56; H04B 2203/5483; H04B 2203/5491
See application file for complete search history.

(56) References Cited

U.S. PATENT DOCUMENTS

2011/0261874 A1 10/2011 Leach
2014/0194076 A1* 7/2014 Hwang .................. H04B 15/06 455/77

(Continued)

FOREIGN PATENT DOCUMENTS

CN 101594045 A 12/2009
CN 207039593 U 2/2018

(Continued)

OTHER PUBLICATIONS

European search report of EP22939702.1.
International Search Report of PCT/CN2022/114506.

*Primary Examiner* — Aristocratis Fotakis

(57) ABSTRACT

A power line carrier communication apparatus, a method, and a system are provided. The power line carrier communication apparatus includes a communication processing unit, a switching network, and an impedance network. The communication processing unit is configured for modulating a communication signal into a control signal, and the communication signal includes communication data. The switching network is configured for generating a multi-level carrier signal according to the control signal, (n+1)th and lower orders of harmonics contained in the carrier signal are less than or equal to a first threshold, respectively, n represents the number of levels of the carrier signal, and n is an odd number greater than or equal to 3. The impedance network is configured for filtering the carrier signal and then coupling the filtered signal to a power line.

15 Claims, 10 Drawing Sheets

(56) References Cited

U.S. PATENT DOCUMENTS

| | | | | |
|---|---|---|---|---|
| 2015/0348531 | A1* | 12/2015 | Freear | B06B 1/0215 367/137 |
| 2019/0097543 | A1* | 3/2019 | Achtzehn | H02M 3/33584 |
| 2020/0136523 | A1* | 4/2020 | Gazit | H02M 7/537 |
| 2022/0146653 | A1* | 5/2022 | Hustava | G01S 7/52006 |
| 2022/0302820 | A1* | 9/2022 | Tada | H02M 7/487 |

FOREIGN PATENT DOCUMENTS

| | | | |
|---|---|---|---|
| CN | 108566094 | A | 9/2018 |
| CN | 112072943 | A | 12/2020 |
| CN | 114553263 | A | 5/2022 |
| EP | 3378151 | B1 | 8/2020 |
| JP | 2000252887 | A | 9/2000 |

* cited by examiner

POWER LINE CARRIER COMMUNICATION APPARATUS, METHOD, AND SYSTEM

CROSS-REFERENCE TO RELATED APPLICATIONS

This application is a continuation of international patent application No. PCT/CN2022/114506, filed on Aug. 24, 2022, which claims priority to Chinese patent applications No. 202210451949.8, filed on Apr. 27, 2022, titled "POWER LINE CARRIER COMMUNICATION APPARATUS, METHOD, AND SYSTEM". The contents of the above applications are hereby incorporated by reference.

TECHNICAL FIELD

The present disclosure generally relates to the field of carrier communication, and in particular, to a power line carrier communication apparatus, a method, and a system.

BACKGROUND

Power line carrier communication may utilize an existing power line as a transmission medium without additional communication cables, which has advantages in terms of implement ability and cost. Therefore, the power line carrier communication is widely applied in application scenarios such as power meter reading and distributed photovoltaic systems.

A conventional power line carrier communication device may first generate carrier communication signals, then filter out high harmonics by filters, and amplify filtered signals by linear power amplifiers and couple the amplified and filtered signals to a power line by a transformer. Disadvantages of the conventional power line carrier communication device are that the linear power amplifier has low efficiency, high loss, and serious heat generation, which makes it unsuitable for some application scenarios that require lower power consumption in transmission and standby.

SUMMARY

According to various embodiments of the present disclosure, a power line carrier communication apparatus, a method, and a system are provided.

In a first aspect, a power line carrier communication apparatus is provided in an embodiment of the present disclosure, including a communication processing unit, a switching network, and an impedance network. The communication processing unit is configured for modulating a communication signal into a control signal, and the communication signal includes communication data. The switching network is configured for generating a multi-level carrier signal corresponding to the communication signal according to the control signal, (n+1)th and lower orders of harmonics contained in the carrier signal are less than or equal to a first threshold, respectively, n represents the number of levels of the carrier signal, and n is an odd number greater than or equal to 3. The impedance network is configured for filtering the carrier signal and then coupling a filtered carrier signal to a power line.

In an embodiment, the switching network includes a plurality of switching elements, and the communication processing unit is further configured for modulating the communication signal into a plurality of control signals with a preset duty cycle and a preset phase difference, and providing the plurality of control signals to the corresponding plurality of switching elements, respectively.

In an embodiment, the communication processing unit is further configured to guarantee coefficients of the (n+1)th and lower orders of harmonics in a Fourier expansion equation of the carrier signal to be less than or equal to a second threshold, by modulating a duty cycle and a phase difference of control signals.

In an embodiment, the communication processing unit further includes a protocol processor and a modulation module. The protocol processor is configured for encapsulating the communication data in accordance with a preset communication protocol to obtain the communication signal. The modulation module is configured for modulating the communication signal into control signals with a preset duty cycle and a preset phase difference.

In an embodiment, the impedance network further includes a filter circuit including a series resonant circuit and a parallel resonant circuit, the series resonant circuit and the parallel resonant circuit are connected in series at an output port of the switching network, the filter circuit is configured for filtering out a direct current component and high harmonics in the carrier signal and coupling a filtered carrier signal to the power line to realize transmission of communication data.

In an embodiment, the impedance network further includes a receiving impedance circuit that forms a decoupling circuit with the parallel resonant circuit, the receiving impedance circuit is connected in parallel with the parallel resonant circuit, the decoupling circuit is configured for extracting the carrier signal on the power line. The communication processing unit further includes a demodulation module, configured for demodulating a carrier signal on the power line and providing a demodulated carrier signal to the protocol processor, and the protocol processor is further configured for parsing the demodulated carrier signal to obtain a communication data packet to realize communication data reception.

In an embodiment, the switching network further includes a first switching element, a second switching element, a third switching element, and a fourth switching element, the first switching element and the second switching element form a first bridge arm, the third switching element and the fourth switching element form a second bridge arm; a midpoint of the first bridge arm is electrically connected to the series resonant circuit, and a midpoint of the second bridge arm is electrically connected to the parallel resonant circuit. When transmitting communication data, the preset duty cycle of the control signals of the first switching element and the third switching element is 1/3, and the preset duty cycle of the control signals of the second switching element and the fourth switching element is 2/3. The first switching element and the second switching element are operated in a complementary manner, the third switching element and the fourth switching element are operated in a complementary manner, the preset phase difference between the control signals of the first switching element and the third switching element is 180°, and the preset phase difference between the control signals of the second switching element and the fourth switching element is 180°.

In an embodiment, the switching network further includes a first switching element, a second switching element, a third switching element, and a fourth switching element, the first switching element and the second switching element form a first bridge arm, the third switching element and the fourth switching element form a second bridge arm, a midpoint of the first bridge arm is electrically connected to the series resonant circuit and a midpoint of the second bridge arm is electrically connected to the parallel resonant circuit. During the transmission of communication data, the preset duty cycle of the control signals of the first switching element and the third switching element is 1/2, and the preset duty cycle of the control signals of the second switching element and the fourth switching element is 1/2. The first switching element and the second switching element are operated in a complementary manner, the third switching element and the fourth switching element are operated in a complementary manner, the preset phase difference between the control signals of the first switching element and the third switching element is 120°, and the preset phase difference between the control signals of the second switching element and the fourth switching element is 120°.

In an embodiment, the receiving impedance circuit further includes a fifth switching element, a sixth switching element, and a first resistor which are connected in series between both ends of the parallel resonant circuit, a drain of the fifth switching element is connected to a first end of the first resistor, a source of the fifth switching element is connected to a source of the sixth switching element, and a gate of the fifth switching element and a gate of the sixth switching element are coupled to the protocol processor. When receiving communication data, the protocol processor provides a mode switching signal to control the fifth switching element and the sixth switching element to be turned on, and the modulation module controls the first switching element, the second switching element, and the third switching element to be turned off and the fourth switching element to be turned on.

In an embodiment, the switching network includes a diode clamped multilevel inverter circuit or a T-type multilevel inverter circuit.

In an embodiment, the receiving impedance circuit includes a first resistor, and the first resistor is connected in parallel with the parallel resonant circuit, during communication data receiving, the modulation module controls switching elements in the switching network to be turned off.

In an embodiment, the power line carrier communication apparatus further includes a bandpass filtering unit, which is connected between the communication processing unit and the impedance network, and configured for filtering the carrier signal extracted by the receiving impedance circuit and providing a filtered carrier signal to the communication processing unit.

In an embodiment, the power line carrier communication apparatus further includes a drive unit configured for generating a drive signal of the switching network according to the control signal.

In a second aspect, a power line carrier communication method is provided in an embodiment of the present disclosure. The method includes: modulating a communication signal into a control signal, the communication signal including communication data; generating a multi-level carrier signal corresponding to the communication signal according to the control signal; and filtering the carrier signal and coupling a filtered carrier signal to a power line. (n+1)th and lower orders of harmonics contained in the carrier signal are less than or equal to a first threshold, respectively, n represents the number of levels of the carrier signal, and n is an odd number greater than or equal to 3.

In a third aspect, a power line carrier communication system is provided in an embodiment of the present disclosure, including a power line carrier communication apparatus in the first aspect.

Details of one or more embodiments of the present disclosure are set forth in the following accompanying drawings and description. Other features, objectives, and advantages of the present disclosure become obvious with reference to the specification, the accompanying drawings, and the claims.

BRIEF DESCRIPTION OF THE DRAWINGS

In order to more clearly illustrate the technical solutions in the embodiments of the present disclosure or the related technology, the accompanying drawings to be used in the description of the embodiments or the related technology will be briefly introduced below, and it will be obvious that the accompanying drawings in the following description are only some of the embodiments of the present disclosure, and that, for one skilled in the art, other accompanying drawings can be obtained based on these accompanying drawings without putting in creative labor.

DETAILED DESCRIPTION OF THE EMBODIMENT

Figure 1:
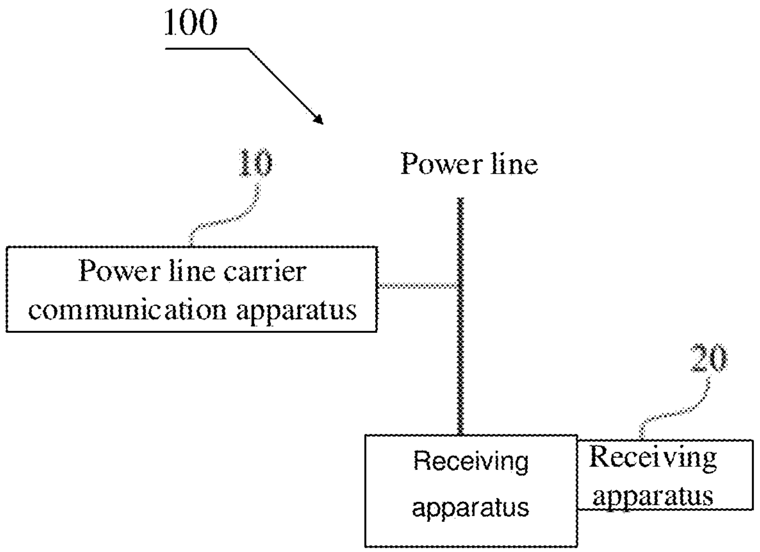
FIG. 1 is a schematic diagram of a power line carrier communication system in one or more embodiments.

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure, but not all of the embodiments. Based on the embodiments in the present disclosure, all other embodiments obtained by one skilled in the art without making creative labor fall within the scope of protection of the present disclosure. In addition, it is also understood that although the efforts made in a development process may be complex and lengthy, some changes in design, manufacture, or production based on technical contents disclosed in the present disclosure are just conventional technical means for one skilled in the art related to the contents disclosed in the present disclosure, and should not be construed as inadequate disclosure of the contents disclosed in the present disclosure.

The reference to “embodiment” in the present disclosure means that a particular feature, structure, or characteristic described in connection with an embodiment may be included in at least one embodiment of the present disclosure. The presence of the phrase at various points in the specification does not necessarily refer to the same embodiment or to a separate or alternative embodiment that is mutually exclusive of other embodiments. It is understood by one skilled in the art, both explicitly and implicitly, that the embodiments described in the present disclosure may be combined with other embodiments without conflict.

Unless defined otherwise, technical terms or scientific terms involved in the present disclosure have the same meanings as would generally understood by one skilled in the technical field of the present disclosure. In the present disclosure, “a”, “an”, “one”, “the”, and other similar words do not indicate a quantitative limitation, which may be singular or plural. The terms such as “comprise”, “include”, “have”, and any variants thereof involved in the present disclosure are intended to cover a non-exclusive inclusion. For example, processes, methods, systems, products, or devices including a series of steps or modules (units) are not limited to these steps or modules (units) listed, and may include other steps or modules (units) not listed, or may include other steps or modules (units) inherent to these processes, methods, systems, products, or devices. Words such as “join”, “connect”, “couple”, and the like involved in the present disclosure are not limited to physical or mechanical connections, and may include electrical connections, whether direct or indirect. “A plurality of” involved in the present disclosure means two or more. The term “and/or” describes an association relationship between associated objects and represents that three relationships may exist. For example, A and/or B may represent the following three cases: only A exists, both A and B exist, and only B exists. Generally, a character “/” indicates an “or” relationship between the associated objects. The terms “first”, “second”, “third”, and the like involved in the present disclosure are only intended to distinguish similar objects and do not represent specific ordering of the objects.

FIG. 1 is a schematic diagram of a power line carrier communication system 100 in an embodiment provided in the present disclosure. Referring to FIG. 1, the power line carrier communication system 100 includes a power line carrier communication apparatus 10 and a receiving apparatus 20, the power line carrier communication apparatus 10 is configured to modulate a communication signal into a carrier signal and couple the carrier signal to a power line, and the receiving apparatus 20 is configured to receive the carrier signal from the power line and parse the carrier signal.

Figure 2:
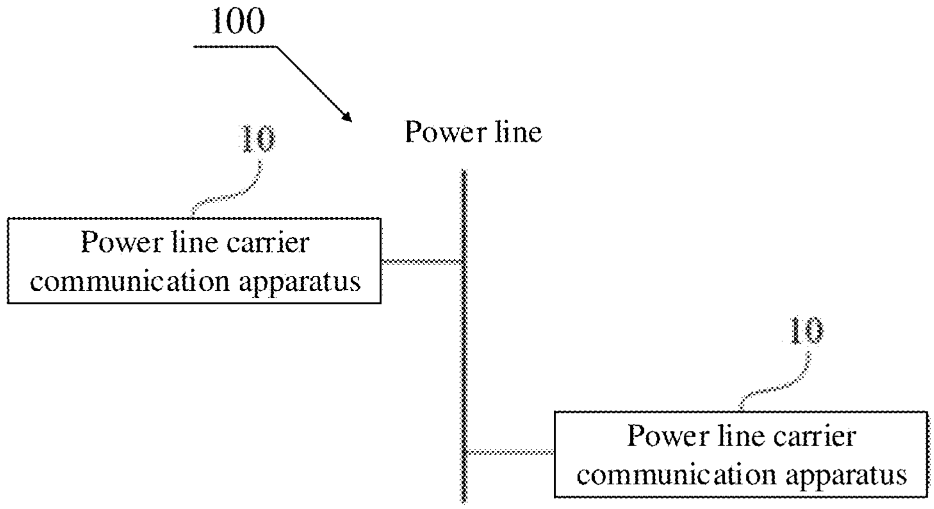
FIG. 2 is a schematic diagram of a power line carrier communication system in one or more embodiments.

FIG. 2 is a schematic diagram of the power line carrier communication system 100 in another embodiment provided in the present disclosure. Referring to FIG. 2, the power line carrier communication system 100 includes at least two power line carrier communication apparatuses 10 in communication with each other. The power line carrier communication apparatuses 10 are configured to modulate a communication signal into a carrier signal and couple the carrier signal to the power line, and also receive the carrier signal from the power line and parse the carrier signal.

Figure 3:
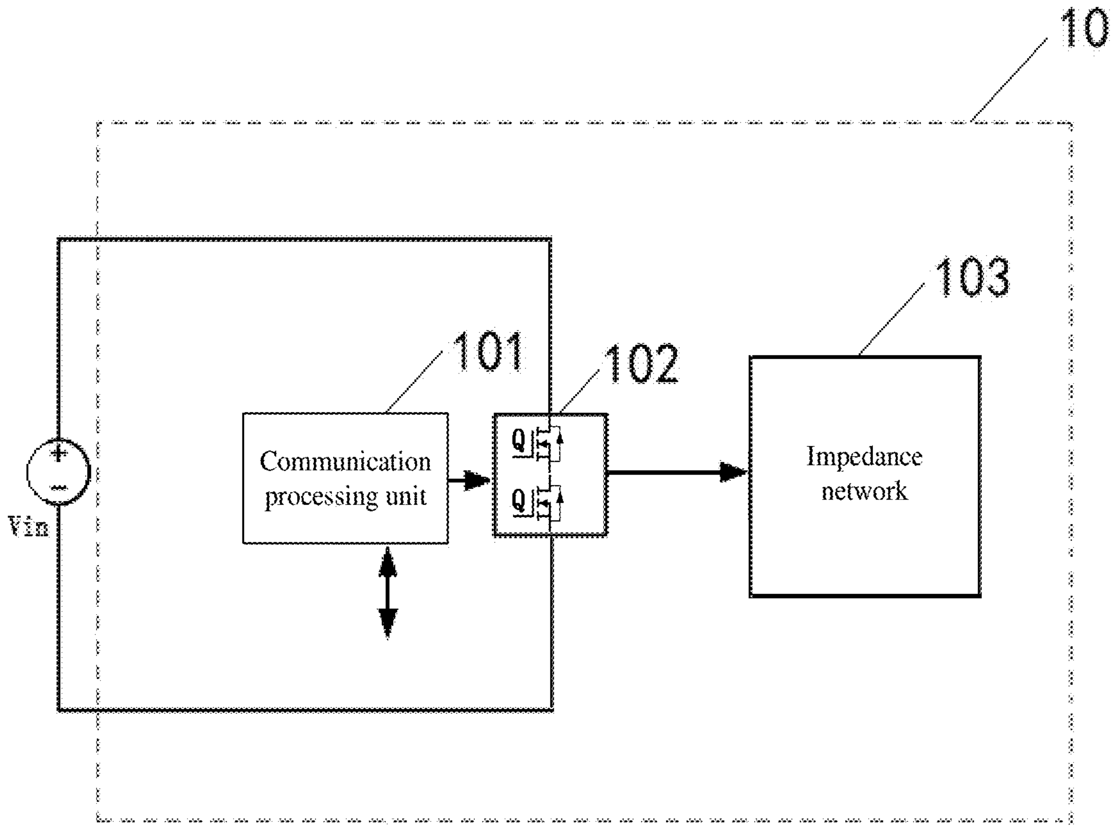
FIG. 3 is a schematic diagram of a power line carrier communication apparatus in one or more embodiments.

The present embodiment provides a power line carrier communication apparatus 10 applicable to the power line carrier communication system 100 in any of the above embodiments. FIG. 3 is a schematic diagram of a power line carrier communication apparatus in an embodiment provided in the present disclosure. Referring to FIG. 3, the power line carrier communication apparatus 10 includes a communication processing unit 101, a switching network 102, and an impedance network 103. The communication processing unit 101 is configured for modulating a communication signal into a control signal, and the communication signal includes communication data. The switching network 102 is configured for generating a carrier signal corresponding to the communication signal according to the control signal. (n+1)th and lower orders of harmonics contained in the carrier signal are less than or equal to a first threshold, respectively, n represents the number of levels of the carrier signal, and n is an odd number greater than or equal to 3. The impedance network 103 is configured for filtering the carrier signal and then coupling a filtered carrier signal to a power line to realize transmission of communication data.

In the present embodiment, the switching network 102 may be applied instead of a conventional linear power amplifier, and power electronic conversion technology may be utilized to substantially improve transmission efficiency of the power line carrier signal and substantially reduce transmission power of the power line carrier signal. At the same time, by means of multi-level technology and suitable modulation strategy, during a signal modulation process, the communication signal may be modulated into the control signal by the communication processing unit 101, and then the multi-level carrier signal corresponding to the communication signal may be generated by the switching network 102 according to the control signal, which may wholly or partially eliminate low harmonics of the multi-level carrier signal generated by the switching network 102, reducing requirements of an output low-pass filter, and substantially reducing the size and cost of the filter.

Referring to FIG. 3, in an embodiment, the switching network 102 may include a plurality of switching elements denoted as Q. The communication processing unit 101 is further configured for modulating the communication signal into a plurality of control signals with a preset duty cycle and a preset phase difference, and providing the plurality of control signals to the corresponding plurality of switching elements Q. The switching network 102 generates a carrier signal with at least three levels.

The communication processing unit 101 is further configured to guarantee coefficients of the (n+1)th and lower orders of harmonics in a Fourier expansion equation of the carrier signal to be less than or equal to a second threshold, by modulating the duty cycle and the phase difference of the control signals. The second threshold may be set according to practical demand, and a purpose of eliminating the harmonics may be achieved when the second threshold is 0.

Figure 4:
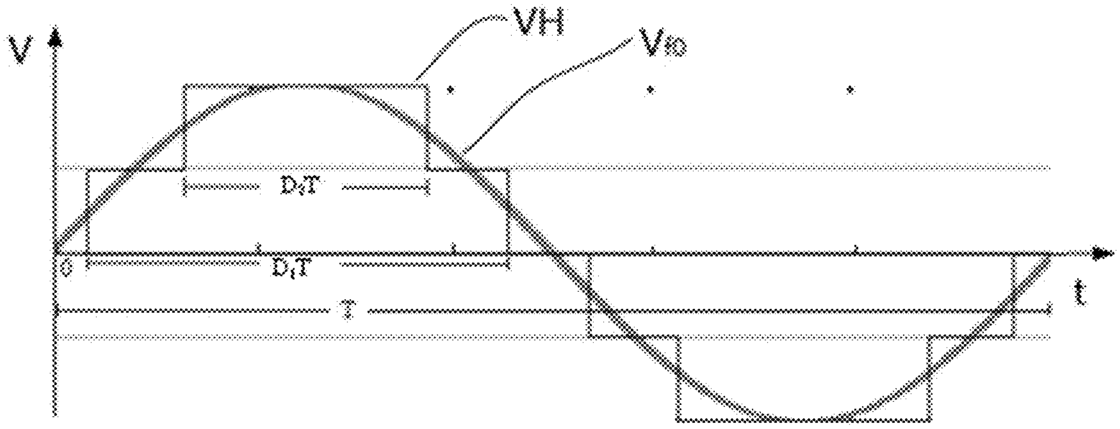
FIG. 4 is a schematic diagram of waveforms of a carrier signal and a fundamental signal in one or more embodiments.

A carrier signal with five levels is used as an example, and FIG. 4 is a schematic diagram of waveforms of a carrier signal and a fundamental signal. VH represents the carrier signal and $V_{f0}$ represents the fundamental signal, the carrier signal VH may be a multilevel square wave with symmetrical waveforms of positive and negative parts, and Fourier transformation can be performed on the carrier signal VH to obtain harmonics. Because of the waveform symmetry, coefficients of even harmonics of the carrier signal VH are 0, i.e., the carrier signal VH may not contain even harmonics. Coefficients of odd harmonics of the carrier signal VH may be $$\frac{4Vin}{\pi l(n-1)/2}\sin\left(\frac{l\pi}{2}\right)\sum_{i=1}^{(n-1)/2}\sin(l\pi D_i),$$

l represents the order of the odd harmonics, $D_i$ represents a sum of proportions accounted by a first level, a second level, . . . , and a [(n+1)/2−i]th level, and the proportions represent a ratio of a duration of a level to a period denoted as T of the carrier signal. Harmonics of the carrier signal may be minimized by modulating Di. Furthermore, coefficients of harmonics may be controlled to be 0, so as to achieve a purpose of eliminating harmonics.

Therefore, at each positive half cycle of the carrier signal, when the proportions of non-zero positive levels satisfy a following formula:

$$\begin{cases}\sum_{i=1}^{(n-1)/2}\sin(3\pi D_i)=0\\ \sum_{i=1}^{(n-1)/2}\sin(5\pi D_i)=0\\ \ldots\\ \ldots\\ \sum_{i=1}^{(n-1)/2}[\sin n\pi D_i]=0\end{cases}\qquad(1)$$

the coefficients of n-th or lower orders of odd harmonics of the carrier signal shall all be 0, the carrier signal will not contain n-th or lower orders of odd harmonics, and i is a positive integer; and $D_i$ represents the sum of the proportions accounted by the first level, the second level, . . . , and the [(n+1)/2−i]th level, the first level>the second level> . . . >the [(n−1)/2]th level>0; and the proportions represent the ratio of the duration of the level to the period of the carrier signal.

It is noted that the preset duty cycle of the control signals, the preset phase difference of the control signals, and a structure of the switching network may not be fixed, and as long as the multi-level carrier signal is generated, the purpose of eliminating the (n+1)th and lower orders of harmonics may be achieved.

Figure 5:
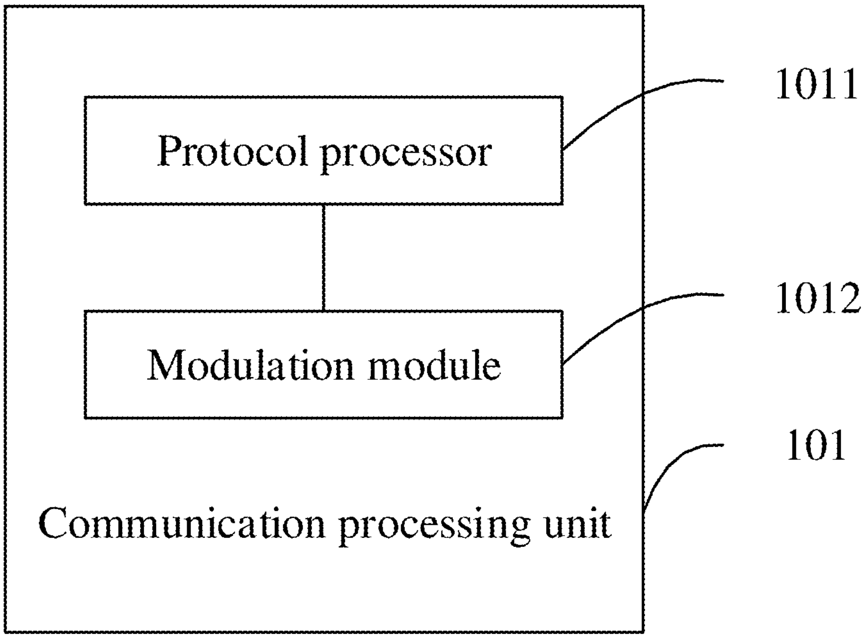
FIG. 5 is a schematic diagram of a communication processing unit in one or more embodiments.

FIG. 5 is a schematic diagram of a communication processing unit in an embodiment provided in the present disclosure. In an embodiment, referring to FIG. 5, the communication processing unit 101 may include a protocol processor 1011 and a modulation module 1012. The protocol processor 1011 is configured for encapsulating the communication data in accordance with a preset communication protocol into a communication signal in digital form and providing the communication signal to the modulation module 1012, and the modulation module 1012 is configured for modulating the communication signal into the control signal for controlling the switching network 102.

Mature modulation techniques that may be used by the modulation module 1012 may include FSK (Frequency shift keying), PSK (Phase shift keying), and the like. The modulation module 1012 may specifically implemented by software, for example, by program codes in an MCU (Microcontroller Unit). The modulation module 1012 may also be implemented by a hardware circuit, for example, by a modulator. The present disclosure is not limited to thereto. In the present embodiment, the communication signal may be a binary digital communication signal. For example, the modulation module 1012 may apply the FSK modulation, the modulation module 1012 may modulate the binary digital communication signal into a signal with two frequencies.

Furthermore, the signal with two frequencies may be modulated into a plurality of control signals according to the preset duty cycle and the preset phase difference, and the multi-level carrier signal including the communication data may be generated by controlling the switchings of the plurality of switching elements Q in the switching network 102, so as to achieve the purpose of eliminating the (n+1)th and lower orders of harmonics in whole or in part.

Figure 6:
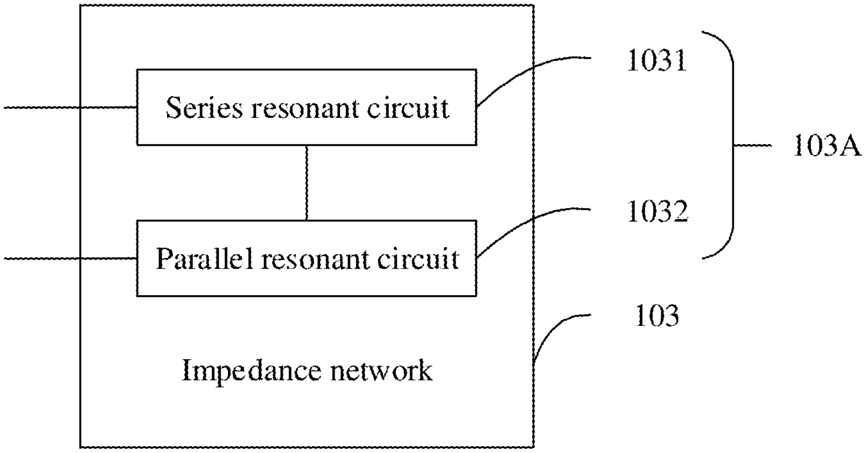
FIG. 6 is a schematic diagram of an impedance network in one or more embodiments.

FIG. 6 is a schematic diagram of an impedance network 103 in an embodiment provided in the present disclosure. In an embodiment, referring to FIG. 6, the impedance network 103 may include a series resonant circuit 1031 and a parallel resonant circuit 1032.

The series resonant circuit 1031 may include a resonant inductor and a resonant capacitor, and the parallel resonant circuit 1032 may include a resonant capacitor and at least one resonant inductor. The resonant inductor may be a winding of a transformer, and the series resonant circuit 1031 and the parallel resonant circuit 1032 may constitute a filtering circuit 103A such as a fourth-order bandpass filter for filtering out a direct current component and high harmonics in the carrier signal and coupling a filtered carrier signal to the power line.

Figure 7:
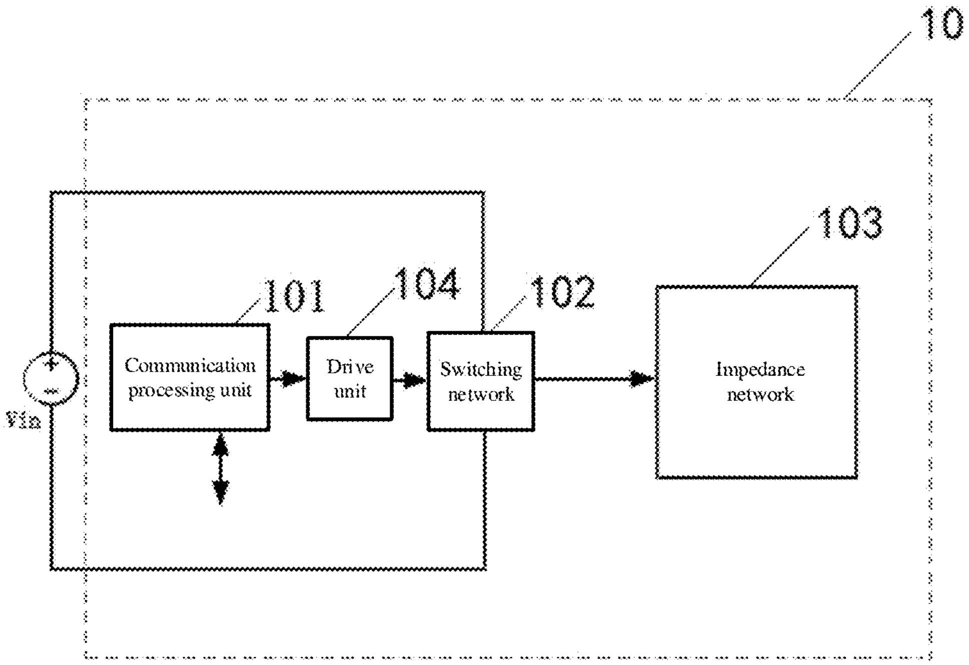
FIG. 7 is a schematic diagram of a power line carrier communication apparatus in one or more embodiments.

FIG. 7 is a schematic diagram of a power line carrier communication apparatus in another embodiment provided in the present disclosure. In the present embodiment, referring to FIG. 7, the power line carrier communication apparatus 10 may further include a drive unit 104 configured for driving the switching network 102, and the drive unit 104 may generate a drive signal of the switching element Q according to the control signal. The drive unit 104 may include a driver chip or a drive circuit including components such as a triode or a field effect transistor.

Figure 8:
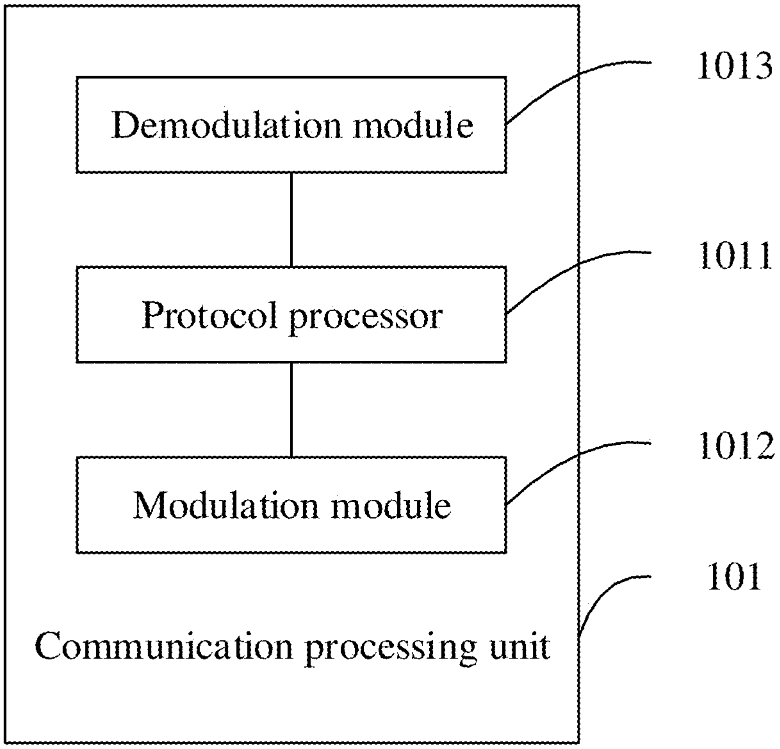
FIG. 8 is a schematic diagram of a communication processing unit in one or more embodiments.

In an embodiment, the power line carrier communication apparatus 10 is also capable of receiving communication data. Referring to FIG. 8, the communication processing unit 101 may further include a demodulation module 1013 configured for demodulating a carrier signal on the power line and providing a demodulated carrier signal to the protocol processor 1011. The protocol processor 1011 may parse the demodulated carrier signal on the power line to obtain the communication data, and the protocol processor 1011 may provide the communication data to an external controller. The impedance network 103 is further configured for extracting the carrier signal on the power line and provide the carrier signal to the communication processing unit 101. The demodulation module 1013 may specifically implemented by software, for example, by program codes in an MCU. The demodulation module 1013 may also be implemented by a hardware circuit, for example, by a demodulator. The present disclosure is not limited to thereto.

Figure 9:
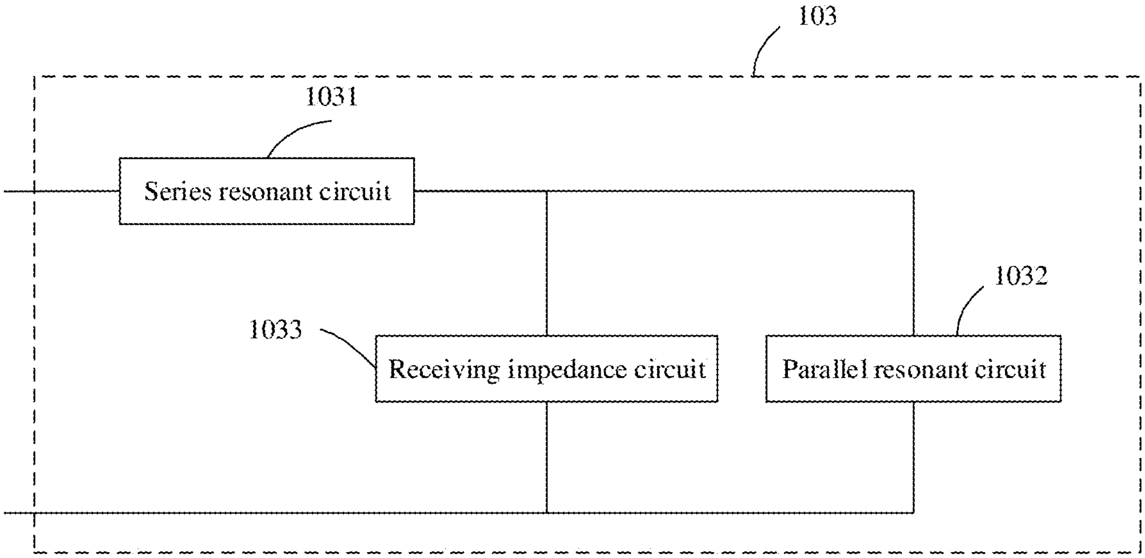
FIG. 9 is a schematic diagram of an impedance network in one or more embodiments.

FIG. 9 is a schematic diagram of an impedance network in another embodiment provided in the present disclosure. In the present embodiment, referring to FIG. 9, the impedance network 103 may further include a receiving impedance circuit 1033. The receiving impedance circuit 1033 may be connected in parallel with the parallel resonant circuit 1032, and the receiving impedance circuit 1033 and the parallel resonant circuit 1032 may form a decoupling circuit for extracting the carrier signal on the power line.

Figure 10:
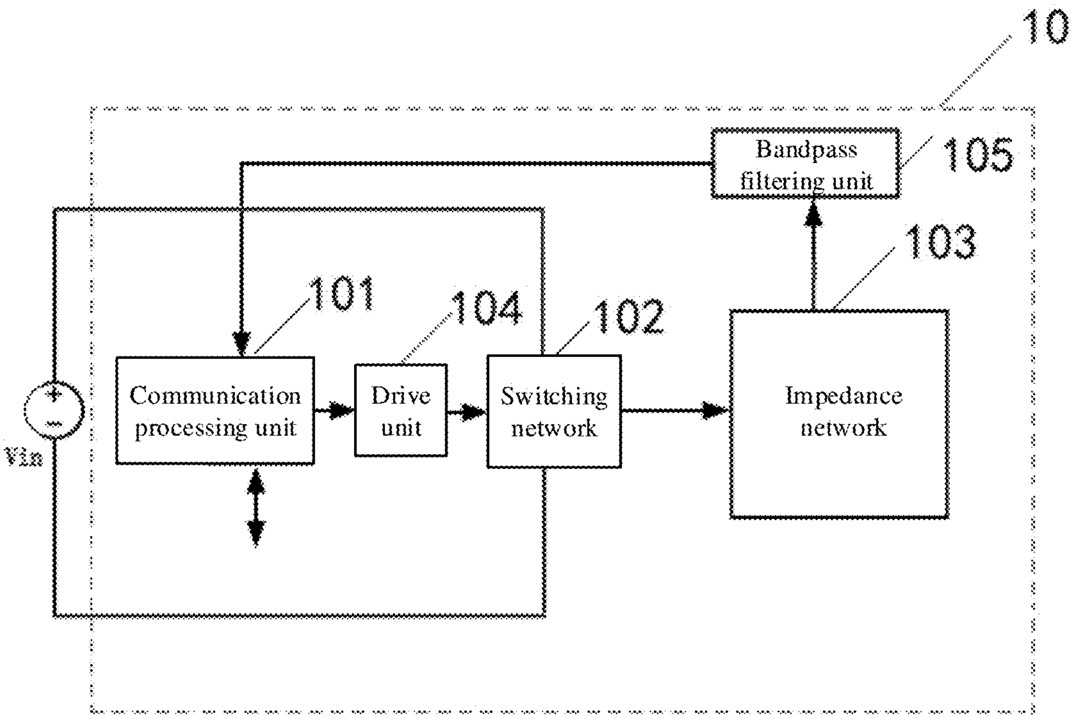
FIG. 10 is a schematic diagram of a power line carrier communication apparatus in one or more embodiments.

FIG. 10 is a schematic diagram of a power line carrier communication apparatus in another embodiment provided in the present disclosure. In the present embodiment, referring to FIG. 10, the power line carrier communication apparatus 10 may further include a bandpass filtering unit 105. The bandpass filtering unit 105 may include a bandpass filter, including a resistor, a capacitor and an operational amplifier. The bandpass filtering unit 105 may be connected to the receiving impedance circuit 1033 in the impedance network 103 for filtering and amplifying the extracted carrier signal on the power line and providing a filtered and amplified carrier signal to the communication processing unit 101.

The demodulation module 1013 may obtain the filtered and amplified carrier signal from the bandpass filter unit 105 and demodulate the filtered and amplified carrier signal into a corresponding digital signal, and the protocol processor 1011 may parse the digital signal to obtain a communication data packet, achieving the communication data reception.

Power line carrier communication apparatuses of any of the above embodiments may be applied to power electronic devices such as shutdown devices for photovoltaic modules, optimizers for photovoltaic modules, inverters, monitors, and the like.

Figure 11:
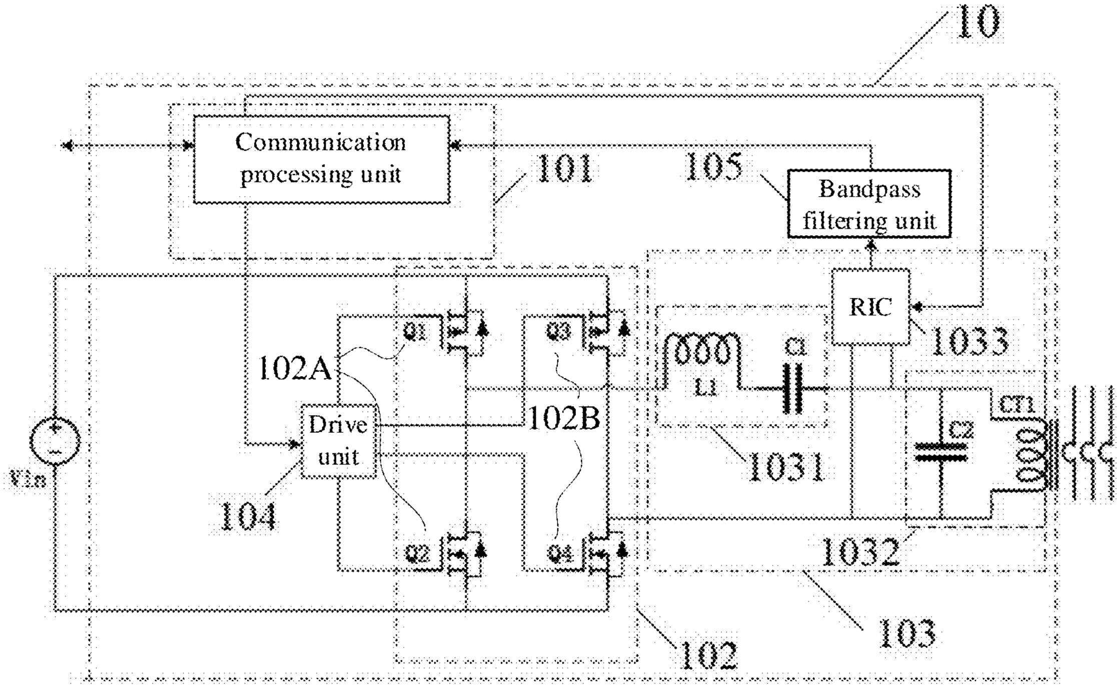
FIG. 11 is a schematic diagram of a power line carrier communication apparatus in one or more embodiments.

FIG. 11 is a schematic circuit block diagram of a power line carrier communication apparatus in a first example embodiment provided in the present disclosure. In the example embodiment, referring to FIG. 11, the power line carrier communication apparatus 10 includes a communication processing unit 101, a switching network 102, an impedance network 103, a drive unit 104, and a bandpass filtering unit 105.

The impedance network 103 includes a series resonant circuit 1031, a parallel resonant circuit 1032, and a receiving impedance circuit (RIC) 1033. The series resonant circuit 1031 includes a first inductor L1 and a first capacitor C1 connected in series, the parallel resonant circuit 1032 includes a second capacitor C2 and a first transformer CT1 connected in parallel, and the impedance network 103 couples the carrier signal to the power line via the first transformer CT1.

The switching network 102 may be a full-bridge module including a first switching element Q1, a second switching element Q2, a third switching element Q3 and a fourth switching element Q4. The first switching element Q1 and the second switching element Q2 may form a first bridge arm 102A, and the third switching element Q3 and the fourth switching element Q4 may form a second bridge arm 102B. The series resonant circuit 1031 and the parallel resonant circuit 1032 may be connected in series between midpoints of the two bridge arms, a midpoint of the first bridge arm 102A may be electrically connected to a first end of the series resonant circuit 1031, a second end of the series resonant circuit 1031 may be connected to a first end of the parallel resonant circuit 1032, and a midpoint of the second bridge arm 102B may be connected to a second end of the parallel resonant circuit 1032. The switching element Q may be a N-channel MOS (Metal-Oxide-Semiconductor) transistor or a P-channel MOS transistor. For example, the first switching element Q1 and the third switching element Q3 may be P-channel MOS transistors, and the second switching element Q2 and the fourth switching element Q4 may be N-channel MOS transistors.

The switching network 102 may further includes an input capacitor Cin (not shown in the Figures) coupled to a DC (direct current) input port of the power line carrier communication apparatus 10, and the input capacitor Cin is configured to stabilize the DC input of the power line carrier communication apparatus 10.

In the present embodiment, the drive unit 104 may apply a half-bridge low-side drive, which is simple in structure and easy to realize.

The switching network 102 may output a three-level square-wave carrier signal including a positive level, a negative level, and a zero level, and the negative half cycle and the positive half cycle of the carrier signal may be symmetrical. From the formula (1), it may be seen that in the positive half cycle, when a ratio D of the duration of the first positive level to the period of the carrier signal is 1/3, the three-level carrier signal may not contain low harmonics such as 2nd, 3rd and 4th harmonics, etc.

Furthermore, when transmitting the communication data, a variety of modulations may be applied to obtain the control signal of the switching network 102 such that D is 1/3, as will be expressed below in conjunction with the accompanying drawings.

Figure 12:
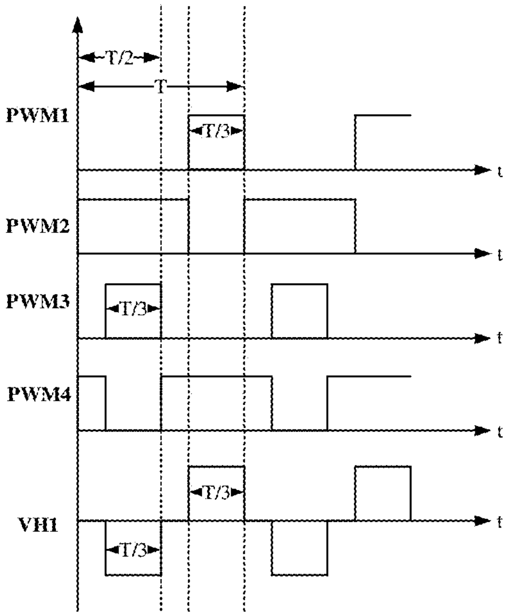
FIG. 12 is a schematic diagram of signals in a modulation mode in one or more embodiments.

FIG. 12 is a schematic diagram of signal waveforms in a modulation mode in the first example embodiment provided in the present disclosure. Referring to FIG. 12, PWM1 to PWM4 are the control signals of the first switching element Q1, the second switching element Q2, the third switching element Q3, and the fourth switching element Q4, respectively, T may be the period of the control signals and the carrier signal, and VH1 may be the carrier signal output from the midpoints of the two bridge arms. The control signals of the first switching element Q1 and the third switching element Q3 may have a preset duty cycle of 1/3, and the control signals of the second switching element Q2 and the fourth switching element Q4 may have a preset duty cycle of 2/3. The first switching element Q1 and the second switching element Q2 may be operated in a complementary manner, and the third switching element Q3 and the fourth switching element Q4 may be operated in a complementary manner. The preset phase difference between a control signal PWM1 of the first switching element Q1 and a control signal PWM3 corresponding to the third switching element Q3 may be 180°, and the preset phase difference between a control signal PWM2 of the second switching element Q2 and a control signal PWM4 of the fourth switching element Q4 may be 180°. The ratio of the duration of the first positive level of the carrier signal VH1 to the period T may be 1/3. From the above analysis, it may be seen that the carrier signal VH1 satisfies a condition of eliminating the low harmonics such as the 2nd, 3rd and 4th harmonics, etc.

Figure 13:
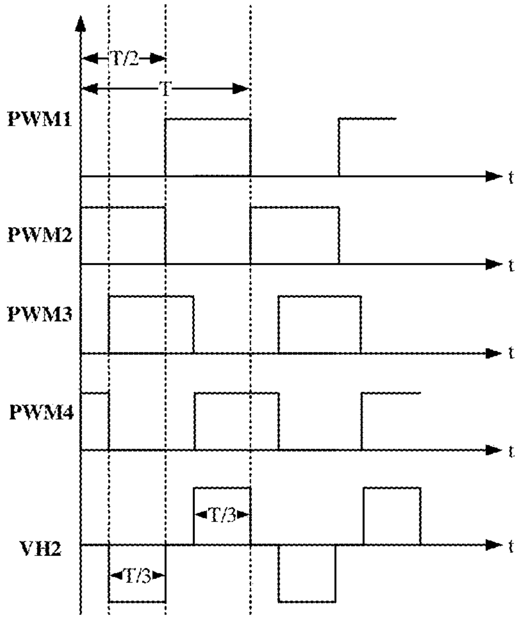
FIG. 13 is a schematic diagram of signals in another modulation mode in one or more embodiments.

FIG. 13 is a schematic diagram of signal waveforms in another modulation mode in the first example embodiment provided in the present disclosure. Referring to FIG. 13, PWM1 to PWM4 are the control signals of the first switching element Q1, the second switching element Q2, the third switching element Q3, and the fourth switching element Q4, respectively, T may be the period of the control signal, and VH2 may be the carrier signal output from the midpoints of the two bridge arms. The control signals of the first switching element Q1 and the third switching element Q3 may have a preset duty cycle of 1/2, and the control signals of the second switching element Q2 and the fourth switching element Q4 may have a preset duty cycle of 1/2. The first switching element Q1 and the second switching element Q2 may be operated in a complementary manner, and the third switching element Q3 and the fourth switching element Q4 may be operated in a complementary manner. The preset phase difference between a control signal PWM1 of the first switching element Q1 and a control signal PWM3 of the third switching element Q3 may be 120°, and the preset phase difference between a control signal PWM2 corresponding to the second switching element Q2 and a control signal PWM4 corresponding to the fourth switching element Q4 may be 120°. The ratio of the duration of the first positive level of the carrier signal VH2 to the period T may be 1/3. From the above analysis, it may be seen that the carrier signal VH2 satisfies the condition of eliminating the low harmonics such as the 2nd, 3rd and 4th harmonics, etc.

Figure 14:
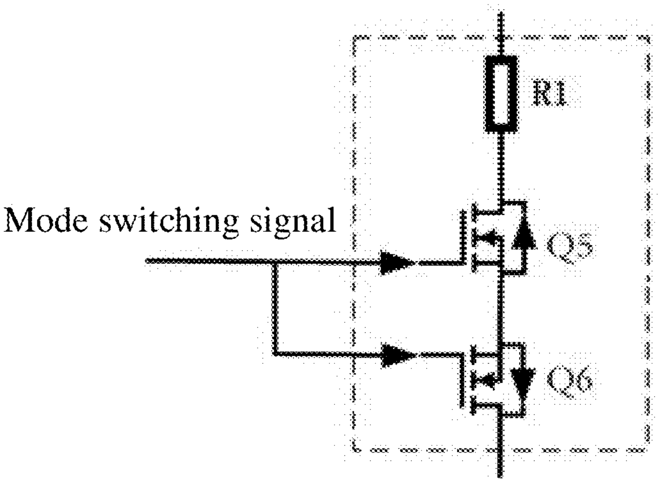
FIG. 14 is a schematic diagram of a receiving impedance circuit in one or more embodiments.

FIG. 14 is a schematic diagram of a receiving impedance circuit in a first example embodiment provided in the present disclosure. Referring to FIG. 14, the receiving impedance circuit 1033 may include a fifth switching element Q5, a sixth switching element Q6, and a first resistor R1. The fifth switching element Q5 or the sixth switching element Q6 may be an N-channel MOS transistor or a P-channel MOS transistor, and the fifth switching element Q5 and the sixth switching element Q6 may be N-channel MOS transistors as an example herein. A drain of the fifth switching element Q5 may be connected to a first end of the first resistor R1, a source of the fifth switching element Q5 may be connected to a source of the sixth switching element Q6, a drain of the sixth switching element Q6 and a second end of the first resistor R1 may be connected to two ends of the parallel resonant circuit 1032, respectively, and gates of the fifth switching element Q5 and the sixth switching element Q6 may be coupled to the protocol processor 1011. The protocol processor 1011 may provide a mode switching signal to control the switchings of the fifth switching element Q5 and the sixth switching element Q6.

When receiving communication data, the modulation module 1012 may control the first switching element Q1, the second switching element Q2, and the third switching element Q3 to be turned off, and control the fourth switching element Q4 to be turned on, and the protocol processor 1011 may control the fifth switching element Q5 and the sixth switching element Q6 to be turned on. The first resistor R1 and the parallel resonant circuit 1032 may form a decoupling circuit, which is configured for extracting a carrier signal on the power line. When transmitting communication data, the fifth switching element Q5 and the sixth switching element Q6 of the receiving impedance circuit 1033 may be in an off state, and the impedance network 103 may be in a high-resistance state in a communication frequency band.

When the protocol processor 1011 receives, for example, the communication data provided by the external controller, the protocol processor 1011 may provide a mode switching signal to switch an operating state of the power line carrier communication apparatus 10 to a communication data transmitting state, and the protocol processor 1011 may provide a mode switching signal to switch the operating state of the power line carrier communication apparatus 10 to a communication data receiving state once the transmission of the communication data is completed.

Figure 15:
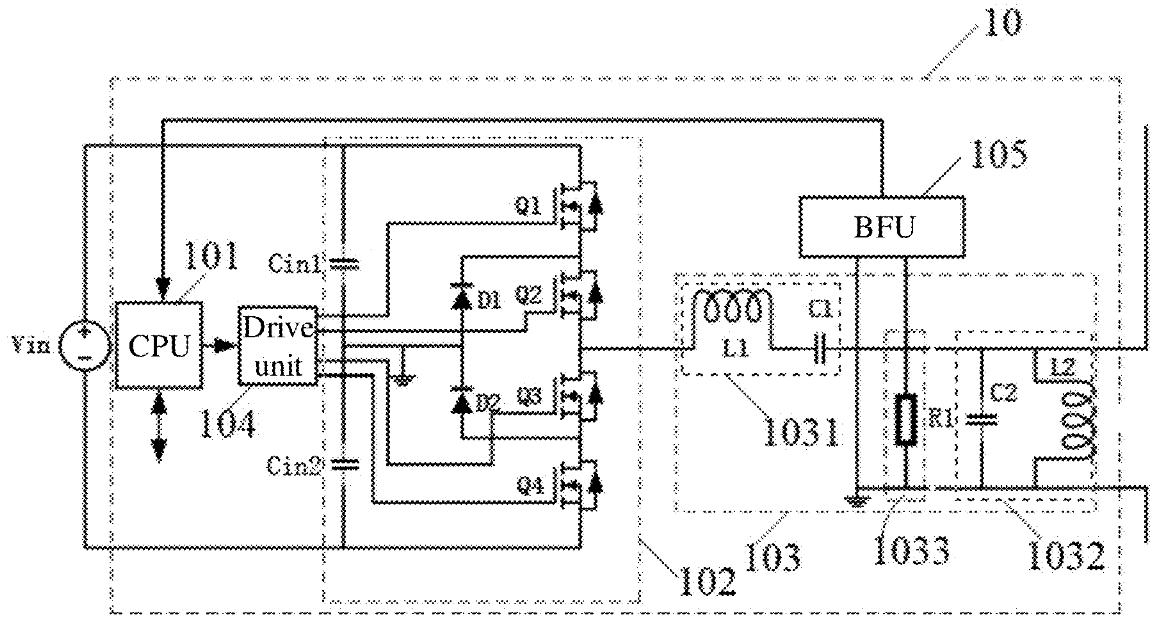
FIG. 15 is a schematic diagram of a power line carrier communication apparatus in one or more embodiments.

FIG. 15 is a schematic diagram of a power line carrier communication apparatus in a second example embodiment provided in the present disclosure. In the example embodiment, referring to FIG. 15, the power line carrier communication apparatus 10 includes a communication processing unit (CPU) 101, a switching network 102, an impedance network 103, a drive unit 104, and a bandpass filtering unit (BFU) 105.

The impedance network 103 includes a series resonant circuit 1031, a parallel resonant circuit 1032, and a receiving impedance circuit 1033. The series resonant circuit 1031 may include a first inductor L1 and a first capacitor C1 connected in series, the parallel resonant circuit 1032 may include a second capacitor C2 and a second inductor L2 connected in parallel, the second inductor L2 may be connected in series with the power line, and the impedance network 103 may couple the carrier signal to the power line via the second inductor L2.

The switching network 102 may include a first input capacitor Cin1, a second input capacitor Cin2, a first switching element Q1, a second switching element Q2, a third switching element Q3, a fourth switching element Q4, a first clamping diode D1, and a second clamping diode D2. The first switching element Q1, the second switching element Q2, the third switching element Q3, and the fourth switching element Q4 may be connected in series sequentially and further connected to a DC input port of the power line carrier communication apparatus 10, and the first input capacitor Cin1 and the second input capacitor Cin2 may be connected in series and further connected to two ends of the DC input port. The first clamping diode D1 and the second clamping diode D2 may be connected in series between a first node between the first switching element Q1 and the second switching element Q2 and a second node between the third switching element Q3 and the fourth switching element Q4. A third node between the first clamping diode D1 and the second clamping diode D2 may be connected to a fourth node between the first input capacitor Cin1 and the second input capacitor Cin2. The series resonant circuit 1031 and the parallel resonant circuit 1032 may be connected in series, and the series resonant circuit 1031 and the parallel resonant circuit 1032 may be connected between the third node and a fifth node between the second switching element Q2 and the third switching element Q3. The first switching element Q1, the second switching element Q2, the third switching element Q3, and the fourth switching element Q4 may be N-channel MOS transistors or P-channel MOS transistors, and the four switching elements are all N-channel MOS transistors as an example herein.

Same as the first embodiment, in the present embodiment, the switching network 102 may also output a three-level square-wave carrier signal including a positive level, a negative level, and a zero level, and the negative half cycle and the positive half cycle of the carrier signal may be symmetrical. When Dis 1/3, the three-level carrier signal may not contain low harmonics such as 2nd, 3rd and 4th harmonics, etc.

Figure 16:
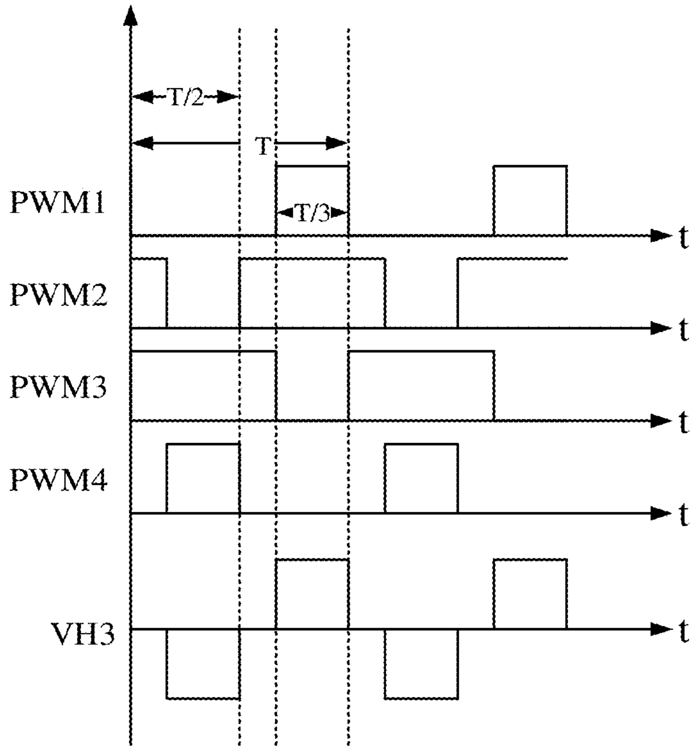
FIG. 16 is a schematic diagram of signals in a modulation mode in one or more embodiments.

FIG. 16 is a schematic diagram of signal waveforms in a modulation mode in the second example embodiment provided in the present disclosure. Referring to FIG. 16, PWM1 to PWM4 are the control signals of the first switching element Q1, the second switching element Q2, the third switching element Q3, and the fourth switching element Q4, respectively, T may be the period of the control signals and the carrier signal, and VH3 may be the three-level carrier signal output from the midpoints of the two bridge arms. The control signals of the first switching element Q1 and the fourth switching element Q4 may have a preset duty cycle of 1/3, and the control signals of the second switching element Q2 and the third switching element Q3 may have a preset duty cycle of 2/3. The first switching element Q1 and the third switching element Q3 may be operated in a complementary manner, and the second switching element Q2 and the fourth switching element Q4 may be operated in a complementary manner. The preset phase difference between the control signal PWM1 and the control signal PWM4 may be 180°, and the preset phase difference between the control signal PWM2 of the second switching element Q2 and the control signal PWM3 of the third switching element Q3 may be 180°. The three-level carrier signals VH3 may satisfy the condition of eliminating the low harmonics such as the 2nd, 3rd, and 4th harmonics, etc. as in the above-described embodiments.

In the present embodiment, the receiving impedance circuit 1033 may include a first resistor R1, and the first resistor R1 may be connected in parallel with the parallel resonant circuit 1032. When receiving communication data, the first switching element Q1, the second switching element Q2, the third switching element Q3, and the fourth switching element Q4 may be in an off state, and the first resistor R1, the second capacitor C2, and the second inductor L2 may form a decoupling circuit, which is configured for extracting the carrier signals on the power line. Compared with the first example embodiment of the present disclosure, two switching elements may be deleted and the cost may be reduced.

Figure 17:
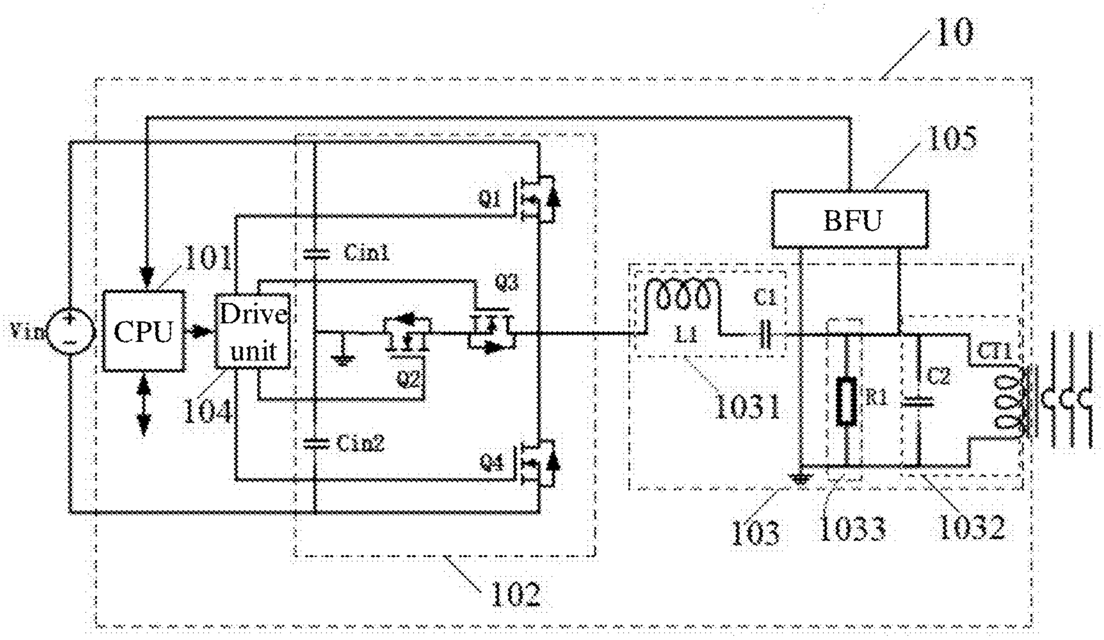
FIG. 17 is a schematic diagram of a power line carrier communication apparatus in one or more embodiments.

FIG. 17 is a schematic diagram of a power line carrier communication apparatus in a third example embodiment provided in the present disclosure. In the embodiment, referring to FIG. 17, the power line carrier communication apparatus 10 includes a communication processing unit (CPU) 101, a switching network 102, an impedance network 103, a drive unit 104, and a bandpass filtering unit (BFU) 105. The impedance network 103 may include a series resonant circuit 1031, a parallel resonant circuit 1032, and a receiving impedance circuit 1033. The series resonant circuit 1031 may include a first inductor L1 and a first capacitor C1 connected in series, and the parallel resonant circuit 1032 may include a second capacitor C2 and a first transformer CT1 connected in parallel, and the impedance network 103 may couple the carrier signal to the power line via the first transformer CT1. The receiving impedance circuit 1033 may include a first resistor R1, and the first resistor R1, the second capacitor C2, and the transformer CT1 form a decoupling circuit, which is configured for extracting the carrier signal from the power line.

The switching network 102 may be a T-type switching network including a first input capacitor Cin1, a second input capacitor Cin2, a first switching element Q1, a second switching element Q2, a third switching element Q3, and a fourth switching element Q4. The first switching element Q1 and the fourth switching element Q4 may be connected in series sequentially and further connected to a DC input port of the power line carrier communication apparatus 10, the second switching element Q2 and the third switching element Q3 may be connected in series between a sixth node between the first input capacitor Cin1 and the second input capacitor Cin2 and a seventh node between the first switching element Q1 and the fourth switching element Q4. The series resonant circuit 1031 and the parallel resonant circuit 1032 may be connected in series, and the series resonant circuit 1031 and the parallel resonant circuit 1032 may be connected between the sixth node and the seventh node. The first switching element Q1, the second switching element Q2, the third switching element Q3, and the fourth switching element Q4 may be N-channel MOS transistors or P-channel MOS transistors, and the four switching elements are all N-channel MOS transistors as an example herein.

The modulation of the switching network in this example embodiment may be the same as that of the second example embodiment, and will not be described in detail.

Figure 18:
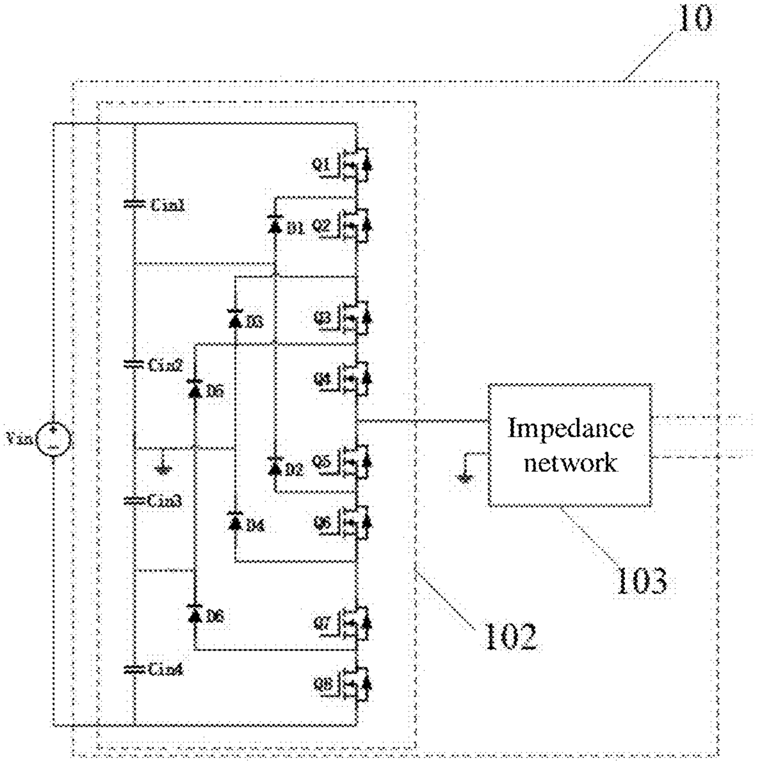
FIG. 18 is a schematic diagram of a power line carrier communication apparatus in one or more embodiments.

FIG. 18 is a schematic diagram of a power line carrier communication apparatus in a fourth example embodiment provided in the present disclosure. In the embodiment, referring to FIG. 18, the power line carrier communication apparatus 10 includes a communication processing unit (not shown in the figure), a switching network 102, an impedance network 103, a drive unit (not shown in the figure), and a bandpass filtering unit (not shown in the figure). The switching network 102 may be a five-level switching network that outputs a five-level carrier signal. Specifically, the switching network 102 may include four input capacitors, eight switching elements, and six clamping diodes.

In the present embodiment, the switching network 102 may output a five-level square-wave carrier signal including a first positive level, a second positive level, a first negative level, a second negative level, and a zero level, and the negative half cycle and the positive half cycle of the carrier signal may be symmetrical. From the formula (1), it may be seen that in the positive half cycle, when the ratio $D_1$ of the sum of the durations of the first positive level and the second positive level to the period T is 13/30, and the ratio $D_2$ of the duration of the first positive level to the period T is 7/30, or, the ratio $D_1$ of the sum of the durations of the first positive level and the second positive level to the period T is 11/30, and the ratio $D_2$ of the duration of the first positive level to the period T is 1/30, the five-level carrier signal may not contain low harmonics such as 2nd, 3rd, 4th, 5th and 6th harmonics, etc.

Figure 19:
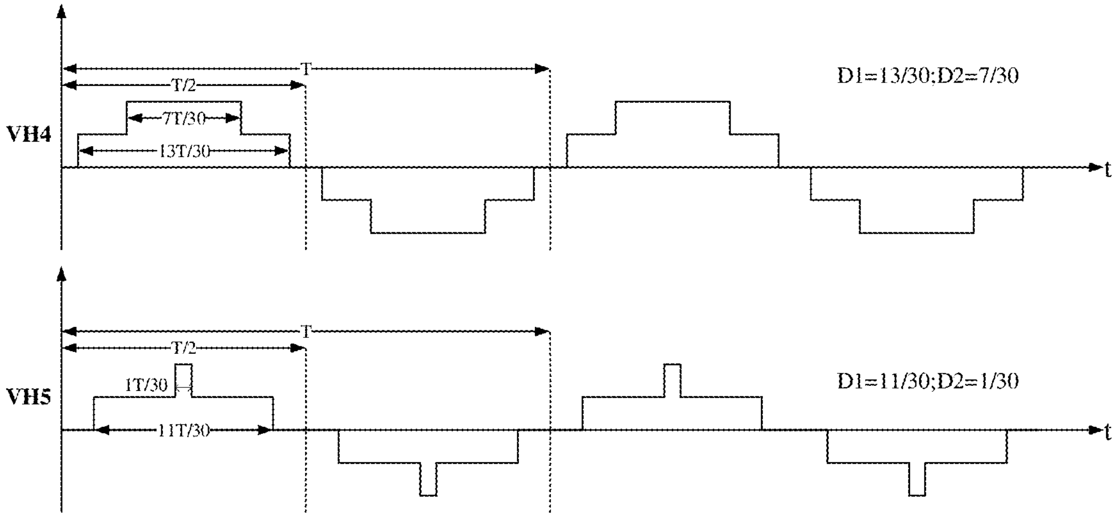
FIG. 19 is a schematic diagram of a carrier signal in one or more embodiments.

FIG. 19 is a schematic diagram of the carrier signal in a fourth example embodiment provided in the present disclosure. Referring to FIG. 19, T may be the period of the control signals and the carrier signal, VH4 and VH5 may be the carrier signals output by the switching network, $D_1$ may be the ratio of the sum of the durations of the first positive level and the second positive level to the period T, and $D_2$ may be the ratio of the duration of the first positive level to the period T. From the above analysis, it can be seen that the five-level carrier signal may satisfy the condition for eliminating the low harmonics such as 2nd, 3rd, 4th, 5th and 6th harmonics, etc.

The present disclosure may not limit the number of levels of the carrier signal, which may be any one of 3, 5, 7 and so on.

Figure 20:
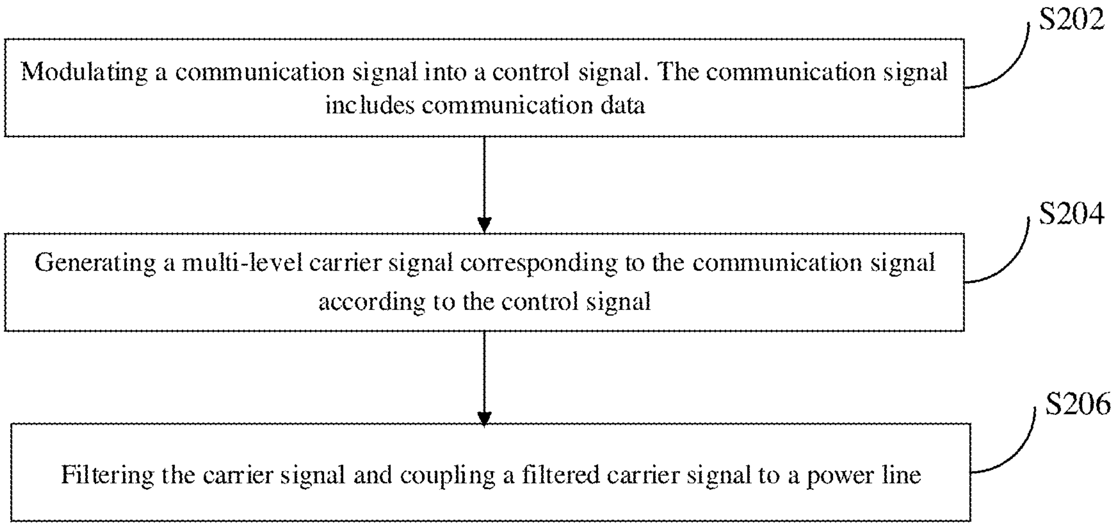
FIG. 20 is a flowchart of a power line carrier communication method in one or more embodiments.

FIG. 20 is a flowchart of a power line carrier communication method in an embodiment provided in the present disclosure. Referring to FIG. 20, the power line carrier communication method includes following step 202 to step 206.

Step 202 includes modulating a communication signal into a control signal. The communication signal includes communication data.

Step 204 includes generating a multi-level carrier signal corresponding to the communication signal according to the control signal.

Where, (n+1)th and lower orders of harmonics contained in the carrier signal are less than or equal to a first threshold, respectively, n represents the number of levels of the carrier signal, and n is an odd number greater than or equal to 3.

Step 206 includes filtering the carrier signal and coupling a filtered carrier signal to a power line.

In the present embodiment, during a signal modulation process, the communication signal may be modulated into the control signal, and then the carrier signal corresponding to the communication signal may be generated in accordance with the control signal, which may completely or partially eliminate low harmonics of the multi-level carrier signal output by the switching network, reduce requirements of an output low-pass filter, and substantially reduce the size and cost of the filter.

The switching network may include a plurality of switching elements Q. The communication processing unit may modulate the communication signal into a plurality of control signals with a preset duty cycle and a preset phase difference and provide the plurality of control signals to the corresponding plurality of switching elements Q. The switching network may generate and output the carrier signal. The communication processing unit may guarantee coefficients of the (n+1)th and lower orders of harmonics in a Fourier expansion equation of the carrier signal to be less than or equal to a second threshold, by modulating the duty cycle and the phase difference of the control signals.

Specific limitations on the method may be referred to the above limitations on the apparatus, which will not be repeated herein.

The various technical features of the above-described embodiments may be combined arbitrarily, and all possible combinations of the various technical features of the above-described embodiments have not been described for the sake of conciseness of description. However, as long as there is no contradiction in the combinations of these technical features, they should be considered to be within the scope of the present specification.

The above-described embodiments express only several embodiments of the present disclosure, which are described in a more specific and detailed manner, but are not to be construed as a limitation on the scope of the present disclosure. For one skilled in the art, several deformations and improvements can be made without departing from the conception of the present disclosure, all of which fall within the scope of protection of the present disclosure. Therefore, the scope of protection of the present disclosure shall be subject to the attached claims.

What is claimed is:

1. A power line carrier communication apparatus, comprising a communication processing unit, a switching network, and an impedance network;

- wherein the communication processing unit is configured for modulating a communication signal into a plurality of control signals with a preset duty cycle and a preset phase difference, and the communication signal comprises communication data;
- the switching network is configured for generating a multi-level carrier signal corresponding to the communication signal according to the plurality of control signals, wherein (n+1)th and lower orders of harmonics contained in the carrier signal are less than or equal to a first threshold, respectively, n represents the number of levels of the carrier signal, and n is an odd number greater than or equal to 3;
- the impedance network is configured for filtering the carrier signal and then coupling a filtered carrier signal to a power line;
- the communication processing unit further comprises a protocol processor and a modulation module;
- the protocol processor is configured for encapsulating the communication data in accordance with a preset communication protocol to obtain the communication signal;
- the modulation module is configured for modulating the communication signal into the plurality of control signals with the preset duty cycle and the preset phase difference; and
- the impedance network further comprises a filter circuit comprising a series resonant circuit and a parallel resonant circuit, the series resonant circuit and the parallel resonant circuit are connected in series at an output port of the switching network, the filter circuit is configured for filtering out a direct current component and high harmonics in the carrier signal and coupling a filtered carrier signal to the power line to realize communication data transmission.

2. The power line carrier communication apparatus of claim 1, wherein the switching network comprises a plurality of switching elements, and the communication processing unit is further configured for providing the plurality of control signals to the corresponding plurality of switching elements, respectively.

3. The power line carrier communication apparatus of claim 1, wherein the communication processing unit is further configured to guarantee coefficients of the (n+1)th and lower orders of harmonics in a Fourier expansion equation of the carrier signal to be less than or equal to a second threshold, by modulating the duty cycle and the phase difference of the plurality of control signals.

4. The power line carrier communication apparatus of claim 1, wherein the impedance network further comprises a receiving impedance circuit that forms a decoupling circuit with the parallel resonant circuit, the receiving impedance circuit is connected in parallel with the parallel resonant circuit, and the decoupling circuit is configured for extracting a carrier signal on the power line; and

- the communication processing unit further comprises a demodulation module, configured for demodulating the carrier signal on the power line and transmit a demodulated carrier signal to the protocol processor, and the protocol processor is further configured for parsing the demodulated carrier signal to obtain a communication data packet to realize the communication data reception.

5. The power line carrier communication apparatus of claim 4, wherein the switching network further comprises a first switching element, a second switching element, a third switching element and a fourth switching element, the first switching element and the second switching element form a first bridge arm, the third switching element and the fourth switching element form a second bridge arm; a midpoint of the first bridge arm is electrically connected to the series resonant circuit, and a midpoint of the second bridge arm is electrically connected to the parallel resonant circuit; and

- when transmitting communication data, the preset duty cycle of the control signals of the first switching element and the third switching element is 1/3, and the preset duty cycle of the control signals of the second switching element and the fourth switching element is 2/3, wherein the first switching element and the second switching element are operated in a complementary manner, the third switching element and the fourth switching element are operated in a complementary manner, the preset phase difference between the control signals of the first switching element and the third switching element is 180°, and the preset phase difference between the control signals of the second switching element and the fourth switching element is 180°.

6. The power line carrier communication apparatus of claim 4, wherein the switching network further comprises a first switching element, a second switching element, a third switching element, and a fourth switching element, the first switching element and the second switching element form a first bridge arm, the third switching element and the fourth switching element form a second bridge arm, a midpoint of the first bridge arm is electrically connected to the series resonant circuit and a midpoint of the second bridge arm is electrically connected to the parallel resonant circuit;

when transmitting communication data, the preset duty cycle of the control signals of the first switching element and the third switching element is 1/2, and the preset duty cycle of the control signals of the second switching element and the fourth switching element is 1/2, wherein the first switching element and the second switching element are operated in a complementary manner, the third switching element and the fourth switching element are operated in a complementary manner, the preset phase difference between the control signals of the first switching element and the third switching element is 120°, and the preset phase difference between the control signals of the second switching element and the fourth switching element is 120°.

7. The power line carrier communication apparatus of claim 5, wherein the receiving impedance circuit further comprises a fifth switching element, a sixth switching element, and a first resistor which are connected in series between both ends of the parallel resonant circuit, a drain of the fifth switching element is connected to a first end of the first resistor, a source of the fifth switching element is connected to a source of the sixth switching element, and a gate of the fifth switching element and a gate of the sixth switching element are coupled to the protocol processor; and when receiving communication data, the protocol processor is capable of providing a mode switching signal to control the fifth switching element and the sixth switching element to be turned on, and the modulation module is capable of controlling the first switching element, the second switching element, and the third switching element to be turned off and the fourth switching element to be turned on.

8. The power line carrier communication apparatus of claim 4, wherein the switching network comprises a diode clamped multilevel inverter circuit or a T-type multilevel inverter circuit.

9. The power line carrier communication apparatus of claim 8, wherein the receiving impedance circuit comprises a first resistor and the first resistor is connected in parallel with the parallel resonant circuit, when receiving communication data, the modulation module is capable of controlling switching elements in the switching network to be turned off.

10. The power line carrier communication apparatus of claim 4, further comprising a bandpass filtering unit, which is connected between the communication processing unit and the impedance network, and configured for filtering the carrier signal extracted by the receiving impedance circuit and providing a filtered carrier signal to the communication processing unit.

11. The power line carrier communication apparatus of claim 1, further comprising a drive unit configured for generating a drive signal of the switching network according to the plurality of control signals.

12. A power line carrier communication system, comprising a power line carrier communication apparatus, wherein the power line carrier communication apparatus comprises a communication processing unit, a switching network, and an impedance network;

the communication processing unit is configured for modulating a communication signal into a plurality of control signals with a preset duty cycle and a preset phase difference, and the communication signal comprises communication data;

the switching network is configured for generating a multi-level carrier signal corresponding to the communication signal according to the plurality of control signals, wherein (n+1)th and lower orders of harmonics contained in the carrier signal are less than or equal to a first threshold, respectively, n represents the number of levels of the carrier signal, and n is an odd number greater than or equal to 3;

the impedance network is configured for filtering the carrier signal and then coupling a filtered carrier signal to a power line;

the communication processing unit further comprises a protocol processor and a modulation module;

the protocol processor is configured for encapsulating the communication data in accordance with a preset communication protocol to obtain the communication signal;

the modulation module is configured for modulating the communication signal into the plurality of control signals with the preset duty cycle and the preset phase difference; and the impedance network further comprises a filter circuit comprising a series resonant circuit and a parallel resonant circuit, the series resonant circuit and the parallel resonant circuit are connected in series at an output port of the switching network, the filter circuit is configured for filtering out a direct current component and high harmonics in the carrier signal and coupling a filtered carrier signal to the power line to realize communication data transmission.

13. The power line carrier communication system of claim 12, wherein the switching network comprises a plurality of switching elements, and the communication processing unit is further configured for providing the plurality of control signals to the corresponding plurality of switching elements, respectively.

14. The power line carrier communication system of claim 12, wherein the communication processing unit is further configured to guarantee coefficients of the (n+1)th and lower orders of harmonics in a Fourier expansion equation of the carrier signal to be less than or equal to a second threshold, by modulating the duty cycle and the phase difference of the plurality of control signals.

15. The power line carrier communication system of claim 12, wherein the impedance network further comprises a receiving impedance circuit that forms a decoupling circuit with the parallel resonant circuit, the receiving impedance circuit is connected in parallel with the parallel resonant circuit, the decoupling circuit is configured for extracting a carrier signal on the power line; and the communication processing unit further comprises a demodulation module, configured for demodulating the carrier signal on the power line and provide a demodulated carrier signal to the protocol processor, and the protocol processor is further configured for parsing the demodulated carrier signal to obtain a communication data packet to realize the communication data reception.

* * * * *